Patented Oct. 12, 1926.

1,602,777

UNITED STATES PATENT OFFICE.

OSKAR NEUBERT, KARL SCHRANZ, AND GEORG WESENBERG, OF ELBERFELD, NEAR COLOGNE-ON-THE-RHINE, GERMANY, ASSIGNORS TO WINTHROP CHEMICAL COMPANY, INC., OF NEW YORK, N. Y.

MERCURY COMPOUND.

No Drawing. Application filed May 8, 1926, Serial No. 107,786, and in Germany June 8, 1925.

The present invention concerns the manufacture of a soluble colloidal mercury thiocyanogen compound and consists in the treatment of solutions of mercury salts with solutions of thiocyanates in the presence of a protective colloid. Obviously the particular thiocyanate may be dissolved with the protective colloid and the solution of the mercury salt subsequently added. The removal of the crystalloids from the mixture is effected by dialysis; drying then follows in any suitable manner. The product thus obtained can be powdered and is easily soluble in water giving colloidal solutions.

Whereas the ordinary mercury thiocyanate finds no application in therapy on account of its practical insolubility, the new colloidal mercury thiocyanoges compound possesses a strong germicidal action coupled with a pronounced penetrating power. The solubility of the new product in water allows of its application in the form of solutions of high concentration. The product obtainable in accordance with our present invention is also particularly suitable for the manufacture of ointments and other forms of application.

The following example will serve to illustrate our invention, the parts being by weight:—

40 parts by weight of albumose are dissolved in 360 parts of water and 220 parts by weight of normal caustic soda lye are added. To the filtered solution 120 parts of a 20% solution of potassium thiocyanate are added and subsequently, slowly and whilst continuously shaking 192 parts by weight of a 20% mercury acetate solution, prepared with the requisite amount of acetic acid until the precipitate produced after each addition has been brought again into solution.

The resulting colloidal solution is subjected to thorough dialysis and carefully evaporated to dryness in a vacuum. The residual greyish brown brittle mass can be easily powdered and dissolved in water giving a clear colloidal solution.

We claim:—

1. The manufacture of a soluble colloidal mercury thiocyanogen compound consisting in the treatment of solutions of mercury salts with solutions of thiocyanates in the presence of a protective colloid.

2. The new colloidal mercury thiocyanogen compound being a greyish brown brittle mass soluble in water giving a colloidal solution.

In testimony whereof we have hereunto set our hands.

OSKAR NEUBERT.
KARL SCHRANZ.
GEORG WESENBERG.